E. MOWRY.
HAY RAKE.
APPLICATION FILED JUNE 1, 1915.
1,294,322.
Patented Feb. 18, 1919.
2 SHEETS—SHEET 2.
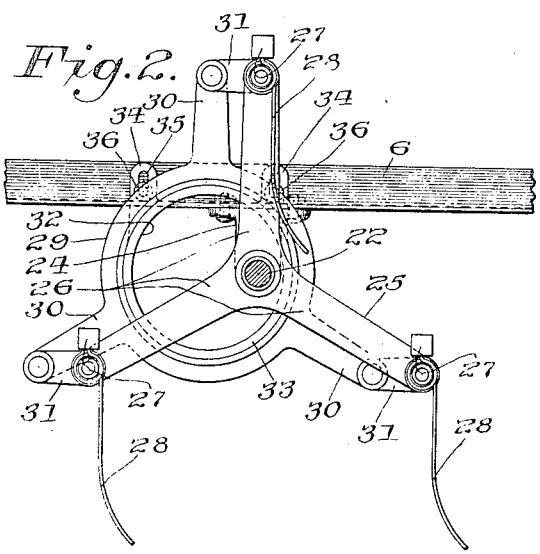
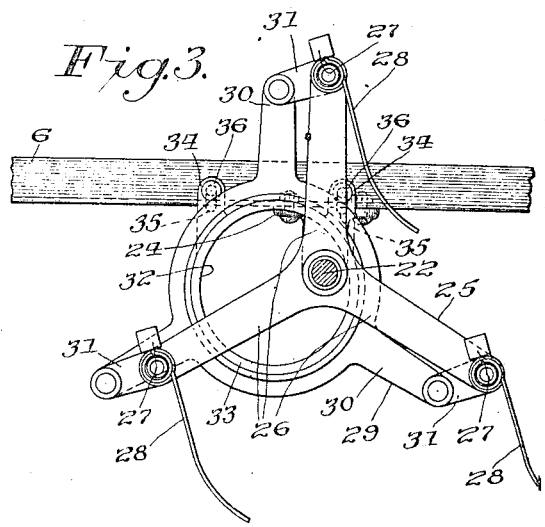
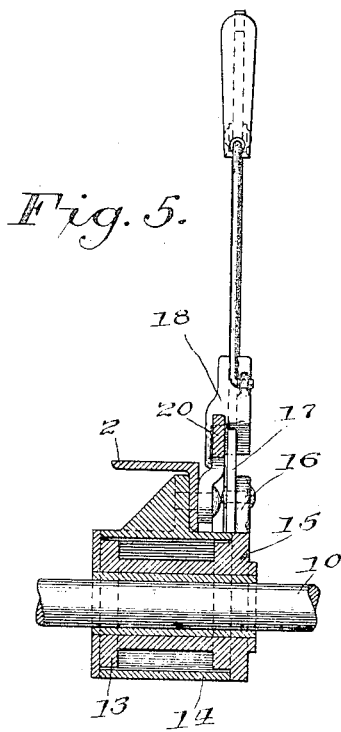
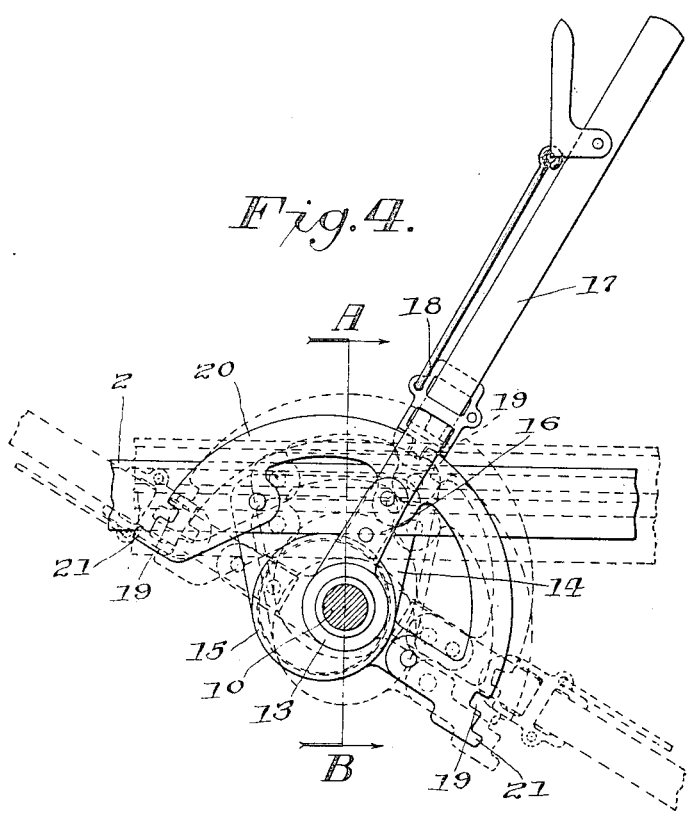
Inventor.
Edward Mowry,
By Chas. E. Lord
Atty.

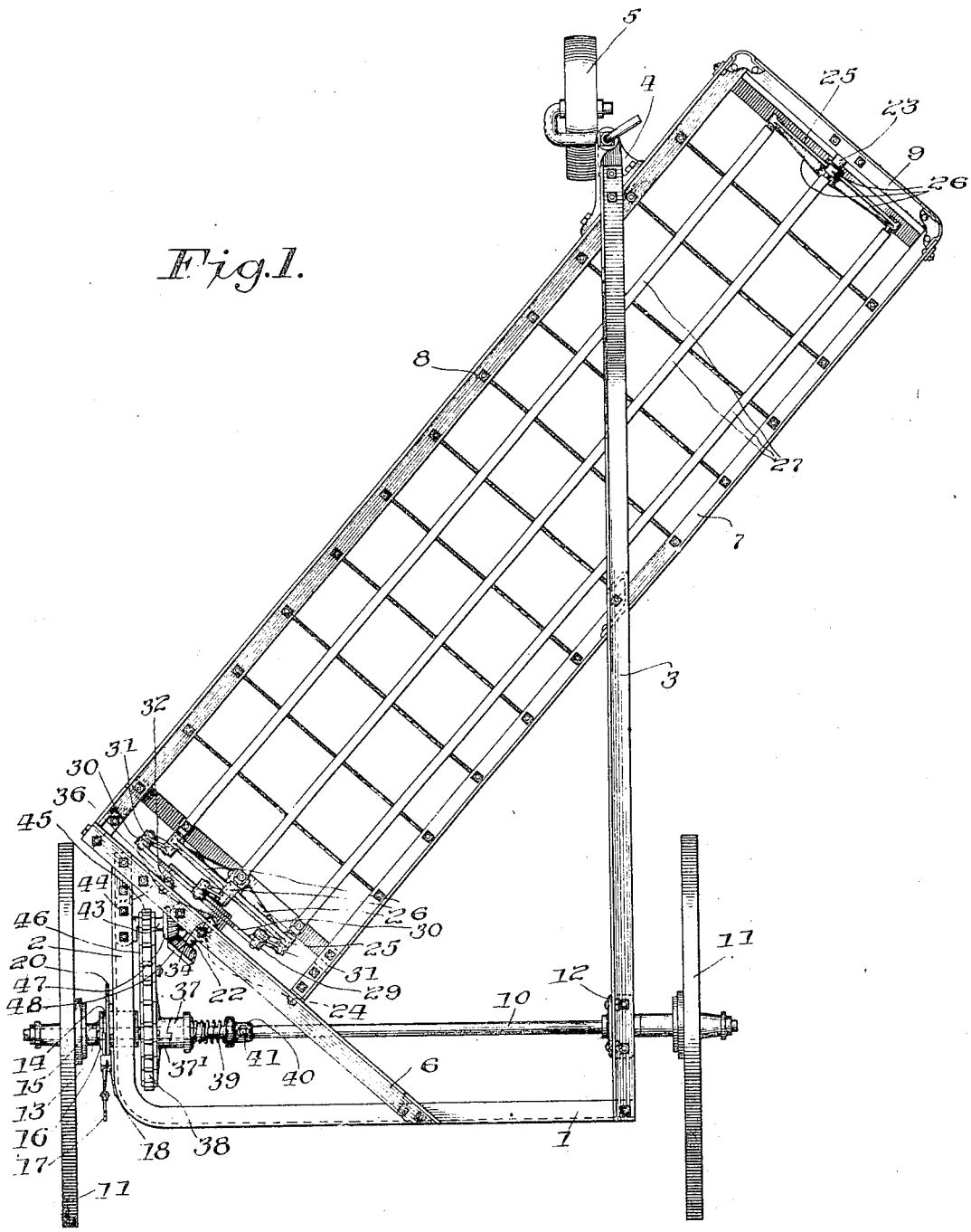

UNITED STATES PATENT OFFICE.

EDWARD MOWRY, OF STERLING, ILLINOIS, ASSIGNOR, BY MESNE ASSIGNMENTS, TO INTERNATIONAL HARVESTER COMPANY, A CORPORATION OF NEW JERSEY.

HAY-RAKE.

1,294,822.   Specification of Letters Patent.   Patented Feb. 18, 1919.

Application filed June 1, 1915. Serial No. 31,569.

*To all whom it may concern:*

Be it known that I, EDWARD MOWRY, a citizen of the United States, residing at Sterling, in the county of Whiteside and State of Illinois, have invented certain new and useful Improvements in Hay-Rakes, of which the following is a full, clear, and exact specification.

This invention relates to hay rakes of the side delivery type, including a wheel frame carried by a mechanism supported by traction wheels, a supplemental frame connected with the wheel frame and inclined to the line of draft of the machine and having a rotatable raking reel mounted thereon, the reel including rockable tooth carrying bars, and means for controlling a rocking movement thereof.

The objects of the invention are to provide means whereby the wheel frame may be adjusted to a higher or lower plane relative to the axle, and adjustable means whereby a rocking movement of the tooth carrying bars may be regulated.

These objects are attained by means of the mechanism illustrated by the accompanying drawings, in which—

Figure 1 is a top plan view of a side delivery hay rake having my invention forming a part thereof;

Fig. 2 is a detached part of the supplemental frame and raking reel designed to illustrate the operation of the means for controlling a rocking movement of the tooth carrying bars;

Fig. 3 is a view similar to Fig. 2 and illustrates the manner of adjusting the means for controlling a rocking movement of the tooth carrying bars;

Fig. 4 is a side elevation of part of the wheel frame, illustrating the manner of adjusting the axle relative thereto; and Fig. 5 is a vertical section of Fig. 4 longitudinally of the axle and along line A—B.

Referring to the drawings, wherein the same reference numerals designate like parts throughout the several views, the wheel frame includes a front transverse member 1 having its end at the right-hand side of the machine turned rearward parallel with the line of draft and forming a side member 2 of the wheel frame, a frame member 3 at the opposite side of the machine having its front end secured to the opposite end of the frame member 1, and 4 represents a bracket member secured to its rear end that is operatively connected with a caster wheel 5, and 6 represents a diagonally disposed wheel frame member having its front end secured to the middle part of the frame member 1 and its rear end to the rear end of the side frame member 2.

The supplemental frame includes front and rear members 7 and 8, respectively, disposed in parallel relation, at right angles to the member 6, and having their front ends secured thereto. The members 7 and 8 extend rearward at an angle with the line of draft and are connected with the member 3 and bracket 4, respectively, and to their rear ends is secured the end of frame member 9. 10 represents a rotatable axle having traction wheels 11 mounted upon its opposite ends, and having one end thereof journaled in a bearing box 12 secured to the frame member 3, and its opposite end in an eccentric sleeve 13 rotatably mounted in a bearing box 14 secured to the side frame member 2 of the wheel frame. The sleeve is provided with a flange 15, and integral with the flange is a radially disposed arm 16, to which is secured a hand lever 17 that is provided with a detent mechanism 18 adapted to selectively engage with notches 19 in a sector 20 secured to the bearing box 14 and frame member 2, and having stop members 21 at its opposite ends to limit the throw of the hand lever 17 in opposite directions. It is preferred that there be three notches 19 in the sector, one at each limit of the throw of the hand lever in opposite directions, and one intermediate those at opposite ends of the sector. When the hand lever is in the position shown by full lines in Fig. 4, the axis of the eccentric sleeve 13 lies in a horizontal line passing through the center of the bearing box 14. When the hand lever is thrown to the right of that position to its limit of throw in that direction, as shown by dotted lines, the wheel frame member 2 is raised relatively to the axle 10, and when the lever is thrown to the left in an opposite direction, the frame is lowered toward the axle, as shown by dotted lines in Fig. 4. As the wheel frame is adjusted in varying planes relative to the axle, it carries with it the adjacent end of the supplemental rearwardly inclined frame and the raking mechanism supported thereby.

Carried by the supplemental frame is a raking reel including an axial shaft 22 having its rear end journaled in a depending bearing bracket 23 secured to the end frame member 9, and its front end in a depending bracket member 24 secured to the diagonally disposed frame member 6 of the wheel frame. 25 represents reel spiders secured to opposite ends of the shaft 22, each comprising preferably three radially disposed arms 26 spaced apart at equal angles about the axis of the shaft. Journaled upon the same ends of the arms are rocking tooth carrying bars 27, and 28 represents rake teeth carried by said bars.

Means for controlling the position of the rake teeth as they are carried around by the rotatable reel include a well-known form of mechanism having an idler spider 29 journaled eccentrically to the axis of the reel shaft 22, preferably at its front end, and provided with radially disposed arms 30 corresponding in number and spaced relation with the arms 26, and 31 represents crank arms secured to the adjacent ends of the tooth carrying bars 27 and pivotally connected with the free ends of the arms 30. The spider 29 is mounted upon a bracket 32 carrying an annular bearing flange 33 surrounding the reel shaft 22, disposed eccentrically thereof and having the spider journaled thereon, as shown in Figs. 2 and 3, and as the reel rotates it carries the idler spider 29 with it, and as the two rotate the spider 29, through the crank arms 31, rocks the bars 27 in a manner to maintain the rake teeth in a predetermined path of movement. The bracket 32 is provided with vertically disposed ear members 34 at opposite sides thereof that are provided with vertically disposed slotted openings 35 whereby it is adjustably secured to the diagonal member 6 of the wheel frame by means of bolts 36 in a manner permitting it to be adjusted in a vertical plane independent of the reel shaft and thereby changing the angle and operative angular path of the rake teeth, as shown in Figs. 2 and 3.

The axle 10 is rotated by the traction wheels connected therewith by any of the well-known forms of backing ratchet mechanism, and 37 represents a clutch member slidably mounted upon the axle and normally held in engagement with the clutch end 37¹ of a sprocket wheel 38 loosely journaled upon the axle adjacent the inner end of the eccentric sleeve 13 by means of a compression spring 39 operative between the slidable clutch member and a collar 40 secured to the axle by means of a set screw 41, the clutch member 37 being provided with an annular flange whereby its position may be controlled by any preferred form of lever mechanism. 43 represents a countershaft disposed parallel with the axle, having one end journaled in a bearing 44 secured to the wheel frame member 2, and its opposite end in a bearing preferably integral with the bracket member 24 secured to the diagonal frame member 6. Secured to the shaft 43, intermediate its ends, is a sprocket wheel 45. 46 is a sprocket chain operatively connecting said wheel with the wheel 38, and 47 represents a bevel pinion secured to the shaft 43 and engaging with a corresponding pinion 48 secured to the front end of the reel shaft 22 whereby motion is transmitted to the raking reel.

Having shown and described a preferred form of my invention, I do not wish that it be confined to the details of construction as illustrated, it being understood that many changes may be made in form and proportion of its parts without departing from the spirit of my invention.

What I claim as my invention, and desire to secure by Letters Patent, is:

1. A side delivery hay rake having, in combination, a wheel frame, a supporting axle, and means for adjusting the frame relative to said axle, said means including an eccentric sleeve carried by said frame and journaled upon said axle.

2. A side delivery hay rake having, in combination, a wheel frame, a rotatable axle, bearings carried by said frame and having said axle journaled therein, one or more of said bearings including a rotatable eccentric sleeve whereby said frame may be adjusted to a higher or lower plane relative to said axle.

3. A side delivery hay rake having, in combination, a wheel frame, bracket members secured to said wheel frame, a rotatable axle, bearing boxes carried by said brackets and having said axle journaled therein, one of said bearing boxes comprising an eccentric sleeve, and means for adjusting said sleeve angularly relative to said axle whereby said frame may be adjusted to a higher or lower plane.

4. A side delivery hay rake having, in combination, a wheel frame, bracket members secured to said wheel frame, bearing boxes carried by said brackets, an axle journaled in said bearing boxes, one of said bearing boxes comprising an eccentric sleeve, a hand lever secured to said sleeve whereby said sleeve may be adjusted angularly, and means for retaining said lever in any desired position of adjustment.

5. A side delivery hay rake having, in combination, a wheel frame, a raking reel journaled in bearings carried by said wheel frame, said reel including rockable tooth carrying bars, means for controlling the rocking movement of said bars including an idler spider journaled eccentrically to the axis of said reel, an eccentric bearing for said spider adjustably secured to said wheel frame and movable bodily with respect to axis of said reel for adjusting said spider vertically relative to said reel, and means for vertically adjusting said wheel frame.

5. A side delivery hay rake having, in combination, a frame, a raking reel, said reel including a shaft journaled in bearings secured to said frame, reel spiders secured to opposite ends of said shaft, rockable tooth carrying bars journaled upon the free ends of the arms of said spiders, crank arms secured to said bars, a bearing member secured to said frame eccentric to the axis of said reel, an idler spider journaled upon said bearing member and having the free ends of its arms pivotally connected with said crank arms, means whereby said bearing member may be bodily adjusted vertically upon said frame and with respect to said reel, and means for vertically adjusting said frame.

In testimony whereof I affix my signature.

EDWARD MOWRY.